United States Patent [19]
Itoh

[11] Patent Number: 5,701,676
[45] Date of Patent: Dec. 30, 1997

[54] PORTABLE ROTARY SAW

[75] Inventor: Akihiro Itoh, Anjo, Japan

[73] Assignee: Makita Corporation, Anjo, Japan

[21] Appl. No.: 644,617

[22] Filed: May 1, 1996

[30] Foreign Application Priority Data

May 9, 1995 [JP] Japan .................. 7-110835

[51] Int. Cl.$^6$ ........................................ B26D 9/00
[52] U.S. Cl. ................................. 30/388; 83/170
[58] Field of Search ................... 30/124, 388, 391, 30/390, 516; 83/170, 171

[56] References Cited

U.S. PATENT DOCUMENTS

| | | | |
|---|---|---|---|
| 2,646,090 | 7/1953 | Kluck | 30/390 |
| 3,245,439 | 4/1966 | Sheps et al. | 30/390 |
| 3,262,472 | 7/1966 | McCarty et al. | 30/390 |
| 3,266,535 | 8/1966 | Brodie | 30/390 |
| 3,267,974 | 8/1966 | Elson | 30/390 |
| 3,662,796 | 5/1972 | Batistelli | 30/390 |
| 3,873,862 | 3/1975 | Butler | 310/50 |
| 3,882,598 | 5/1975 | Earle et al. | 30/390 |
| 4,675,999 | 6/1987 | Ito et al. | 30/390 |
| 5,146,682 | 9/1992 | Blöchle | 30/391 |
| 5,537,748 | 7/1996 | Takahashi et al. | 30/391 |

FOREIGN PATENT DOCUMENTS

| | | |
|---|---|---|
| 3500371 C2 | 12/1988 | Germany. |
| 7-31301 | 6/1995 | Japan. |

*Primary Examiner*—Maurina T. Rachuba
*Attorney, Agent, or Firm*—Lahive & Cockfield, LLP

[57] ABSTRACT

A portable rotary saw includes a cooling fan fastened to the output shaft of a motor and a plurality of ports provided downstream of the fan in a blade case defining a blade chamber. The ports allow the cooling air delivered by the fan to blow further downstream in the housing of the portable rotary saw. The portable rotary saw further includes a cover plate provided in front of the ports for separating a pathway of a wind caused by a rotating saw blade and for directing the cooling air out of the blade chamber without disturbing the wind caused by the rotating saw blade.

11 Claims, 3 Drawing Sheets

PORTABLE ROTARY SAW

BACKGROUND OF THE INVENTION

1. Field of the Invention

The present invention relates to electric power driven tools and particularly to improvements in electric power driven rotary saws.

2. Description of the Prior Art

A known electric power driven rotary saw includes a cooling fan secured to the output shaft of a motor in a motor housing in which the cooling fan, when driven to rotate by the motor, draws cooling air into the motor housing through an air intake provided at the rear of the motor housing. The drawn air is then discharged to the atmosphere through an air outlet provided on the side of the motor housing. In such a design, however, the cooling air makes a lot of exhaust noise at the air outlet, thereby creating an uncomfortable work environment for the operator. In order to overcome this disadvantage, the assignee of the present invention disclosed an exhaust noise muffling system for a rotary saw in Japan Utility Model Application No. H5-61626. In this improvement, a plurality of ports, in place of the air outlet, are provided downstream of a cooling fan in the blade case forming a blade chamber. To muffle the exhaust noise of the cooling air, cooling air from the fan is introduced through the ports into the blade chamber and then discharged out of the apparatus, instead of discharged directly to the atmosphere from the motor housing. A rotary saw having a similar construction is also disclosed in U.S. Pat. No. 3,873,862.

Such rotary saws, however, are designed to blow chips with the wind or airflow caused by the circular saw blade rotating in the blade case through the chip collecting pathway formed from the front cutting edge of the circular saw blade along the periphery thereof, and blow the chips out of the blade case. In this configuration, however, the cooling air introduced into the blade chamber through the ports blows against the blade, thus disturbing the airflow along the chip collecting pathway and reducing the chip collecting efficiency.

SUMMARY OF THE INVENTION

Therefore, an object of the present invention is to provide a portable rotary saw that can direct the cooling air into a blade chamber through ports without adversely affecting the chip collecting function of the apparatus.

The above and other related objects are realized by providing in a blade case of a portable rotary saw a cooling air passage that is separated and isolated from a chip collecting pathway, along which the wind caused by a blade blows, for delivering cooling air out of a blade chamber.

The above cooling air passage may be formed with a cover plate provided in front of the exit side of the ports which encloses the blade chamber and has an opening at the end opposite to the sawing direction.

In the operation of the portable rotary saw thus constructed, the cooling air introduced into the blade chamber through the ports is delivered along the cooling air passage out of the apparatus, separated from the wind caused by the rotating blade, thus not affecting the chip collecting function performed by the wind caused by the rotating blade.

A cover plate such as the one described above can easily and simply form the cooling air passage.

DETAILED DESCRIPTION OF THE PREFERRED EMBODIMENTS

Figure 1:
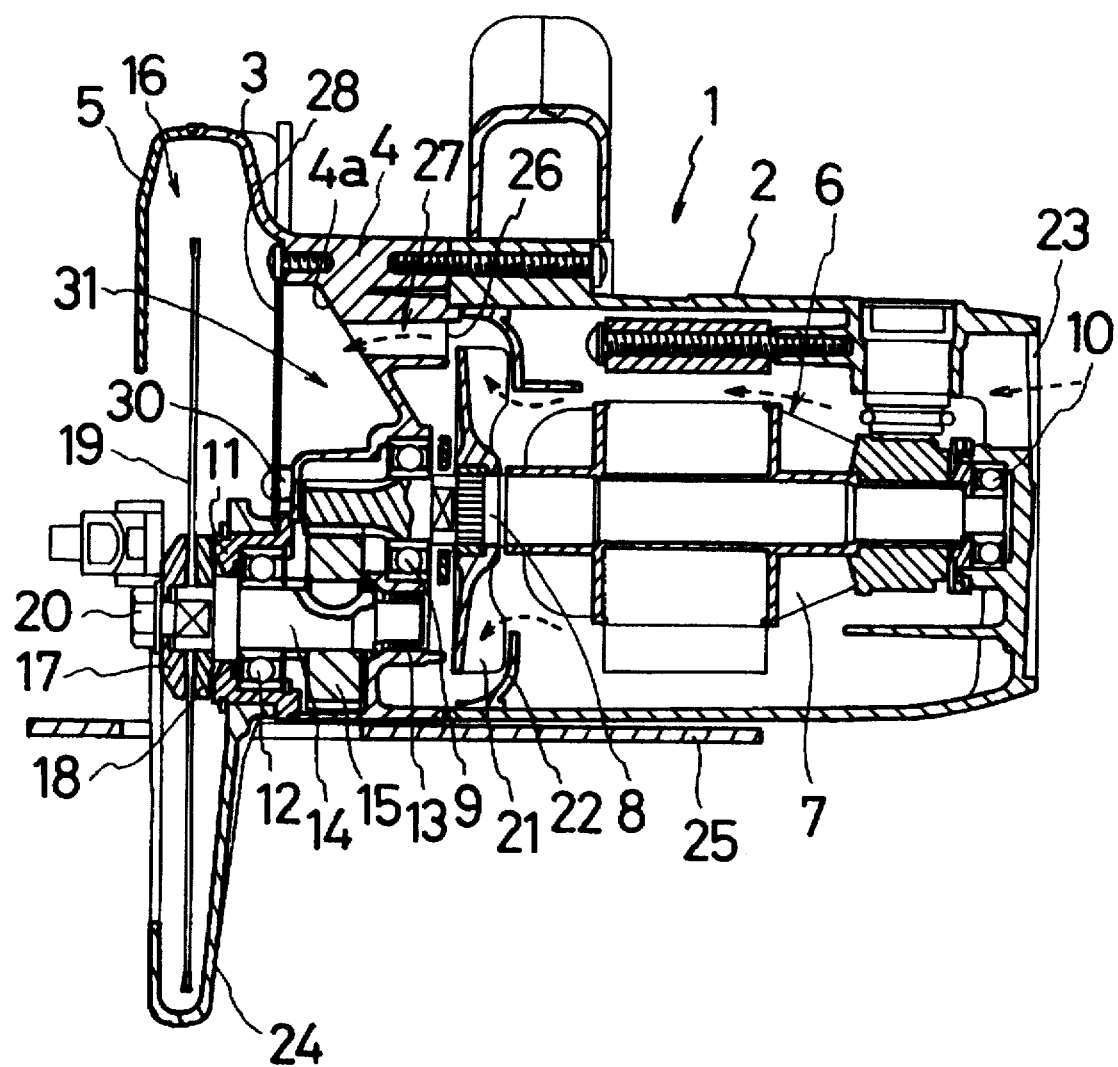
FIG. 1 is a vertical sectional view of a portable rotary saw in accordance with the present invention.

Referring to FIG. 1, a rotary saw 1 includes a motor 8 mounted in a motor housing 2. The motor 6 has an armature 7 wound on an output shaft 8. The front end of the output shaft 8 is supported in a ball bearing 9 provided in a generally cylindrical head 4 in the rear of a blade case 3 while the rear end of the output shaft 8 is likewise supported in ball bearing 10 provided in the rear of the motor housing 2 (the blade case side of the rotary saw 1 is referred to as the front and the motor housing side the rear hereinafter). The output shaft 8 delivers rotary power of the motor 6 through a helical gear 15 to a spindle 14 rotatably supported by a ball bearing 12 in a bearing box 11 and a needle bearing 13 in the cylindrical head 4. The spindle 14 extends in parallel to the output shaft 8. The blade case 3 and a blade case cover 5, which is fastened along its edge to the blade case 3 with screws 5a (shown in FIG. 2), define a blade chamber 16, in which a circular saw blade 19 is interposed between an outer flange 17 and an inner flange 18. A check bolt 20 is screwed into the front end of the spindle 14 to fasten the circular saw blade 19, the outer flange 17, and the inner flange 18 to the spindle 14.

Furthermore, the output shaft 8 has a cooling fan 21 secured thereto between the ball bearing 9 and the armature 7. The motor housing 2 is provided with a baffle plate extending between the cooling fan 21 and the armature 7. An air intake 23 is also provided in the rear of the motor housing 2. Reference numeral 24 designates a blade guard while reference numeral 25 designates a base plate.

Figure 2:
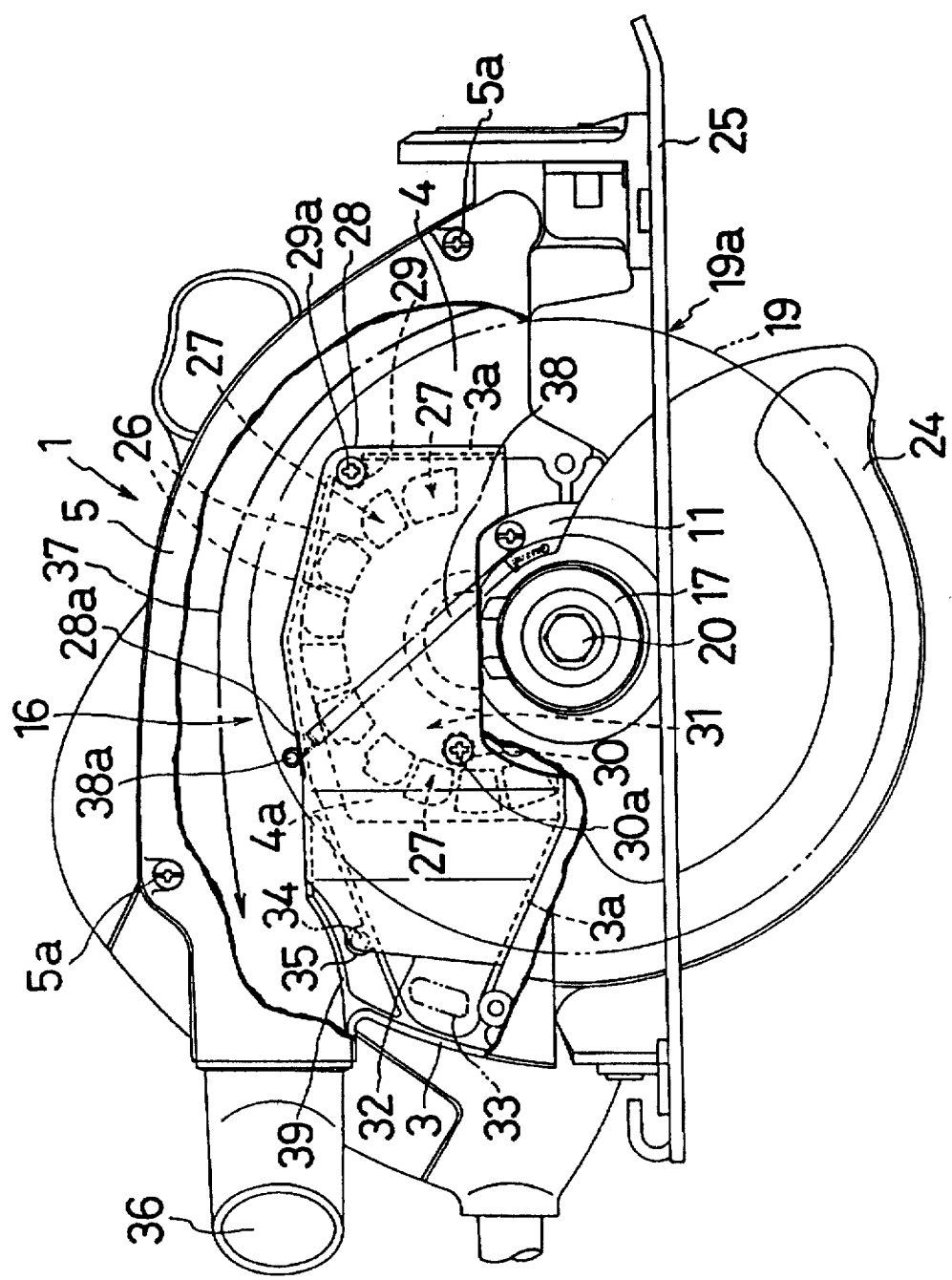
FIG. 2 is an elevational view of a portable rotary saw in accordance with the present invention with parts partially broken away.
Figure 3:
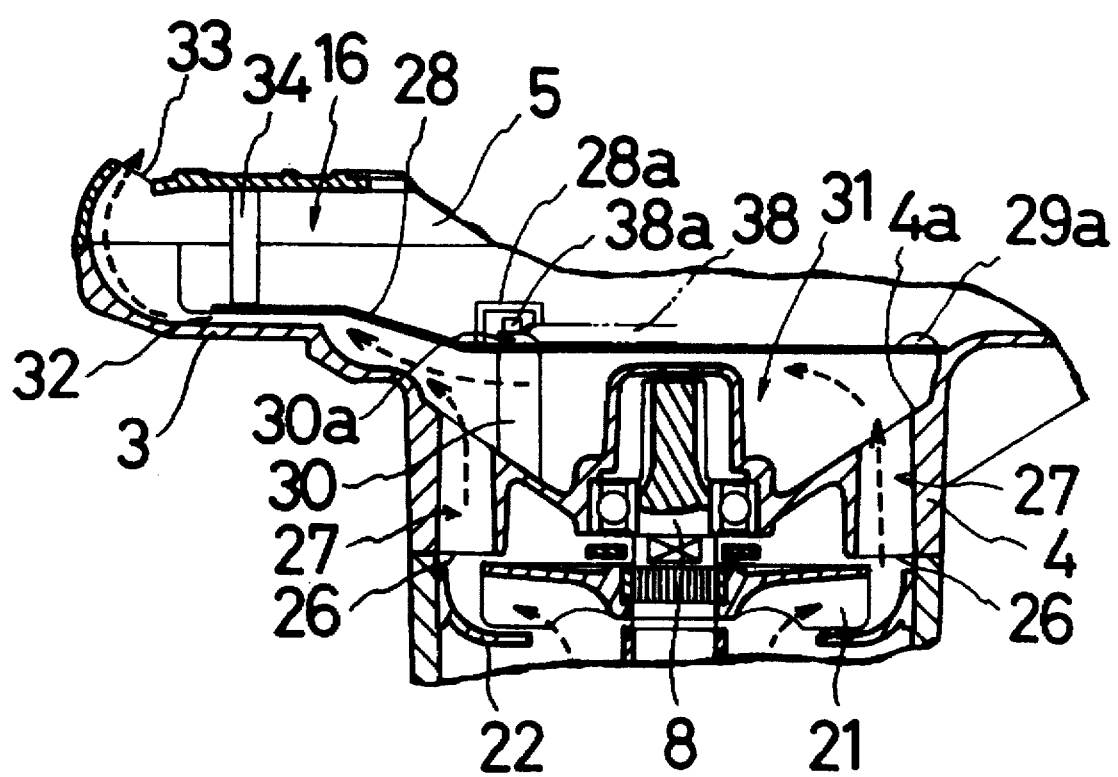
FIG. 3 is a sectional view illustrating the passage of cooling air along a cover plate in accordance with the present invention.

Referring to FIGS. 1 and 2 (the latter shows the portable rotary saw of the present embodiment with part of the blade case cover 5 and the blade guard 24 partially broken away), the cylindrical head 4 includes an inverted inclination 4a, which forms a generally half-conical recess that deepens in the rear direction. A plurality of ports 27 defined by ribs 26 are provided in the inclination 4a, with the ports 27 arranged radially with the output shaft as the center. Also, the ribs 26 extends in the rear direction in parallel with the shaft 8. The ports 27 allows communication between both sides of the inclination 4a in the cylindrical head 4. Provided in front of the inclination 4a is a cover plate 28, disposed generally perpendicular to the output shaft 8. The cover plate 28 fits over a frame 3a formed on the blade case 3 and the upper edge of the bearing box 11. Secured with screws 29a and 30a tightened into the threaded holes 29 and 30, respectively, the cover plate 28 forms a guide passage 31 by closing off the blade chamber 16 in front of the inclination 4a. The cover plate 28 is provided with an opening 32 (best seen in FIG. 3) at the end opposite to the sawing direction (the sawing direction is to the left in FIG. 2.) for allowing communication between the guide passage 31 and the blade chamber 16, though the guide passage 31 and the blade chamber 16 are otherwise separated from one another. An air outlet 33 is formed in the blade case cover 5 in front of the opening 32. Furthermore, the blade case cover 5 is also provided on the inner surface with a boss 34 abutting on the front surface of the cover plate 28. Likewise, the blade case 3 has a boss 35 integrally formed on the frame 3a. The bosses 34 and 35 are located on the same axis across the cover plate 28, so that when the blade case cover 5 is set in place, the cover plate 28 is secured therebetween.

A spring 38 is fastened at its opposite ends to the blade guard 24 and a stud 38a projecting on the blade case 3.

normally urging the blade guard 24 in the counterclockwise direction as shown in FIG. 2. The spring 38, traversing the cover plate 28, is fastened to the stud 38a tightly through a U-shape member 28a provided upright on the cover plate 28. When the portable rotary saw 1 is assembled, the U-shape member 28a prevents the spring 38 from being disconnected from the stud 38a.

Rotation of the circular saw blade 19 causes airflow creating a chip collecting pathway 37 from a front cutting edge 19a along the periphery of the circular saw blade 19 to an outlet opening 36, to which a dust bag is connected. Also, a dividing wall 39 is formed between the chip collecting pathway 37 and the opening 32 along the end of the chip collecting pathway 37.

In the operation of the portable rotary saw 1 thus constructed, the cooling fan 21, driven to rotate by the motor 6, draws cooling air into the motor housing 2 through the air intake 23, thereby cooling the motor 6, as indicated by the broken line arrows in FIG. 1. The cooling air 6 is further drawn between the baffle plate 22 and the output shaft 8 toward the cylindrical head 4 in front of the cooling fan 21. It eventually flows through the ports 27 in the cylindrical head 4 into the compartment 31. Since the guide passage 31 is sealed by the cover plate 28 except in the opening 32, the air is discharged out of the opening 32, which provides the only exit, into the blade chamber 16, and eventually to the atmosphere through the air outlet 33.

Meanwhile, the wind or airflow caused by the rotation of the circular saw blade 19 blows from the front cutting edge 19a through the chip collecting pathway 37 to the outlet opening 36. In this process, the cooling air drawn by the cooling fan 21, completely isolated from the airflow along the chip collecting pathway 37, does not blow against the circular saw blade 19. Therefore the cooling air neither interferes with nor disturbs the airflow along the chip collecting pathway 37, so that the chip collecting or discharging functions of the portable rotary saw 1 is not adversely affected. At the same time, the exhaust noise of the cooling air is still effectively muffled since it is introduced into the blade chamber.

Although the opening 32 is preferably provided on the cover plate 28 at the end opposite to the sawing direction as in the above embodiment, variations and modifications are possible, including its position, size, shape, and direction as long as it does not effect the chip collecting or discharging functions along the chip collecting pathway 37. Furthermore, a plurality of openings may also be provided instead of a single opening as in the above embodiment.

Moreover, although in above embodiment, the cooling air is led out of the blade chamber 16 through the air outlet 33, the air outlet 33 may be dispensed with.

Although a partition such as the flat cover plate described above can easily direct cooling air, the partition need not be a flat plate; a pipe, a round plate whose vertical cross section forms an approximate half circle, or a wall integrally formed with the blade case will also suffice.

According to the present invention, cooling air delivered into the blade chamber can be directed with a guide passage alone in such a manner that the cooling air does not cause air disturbance in the blade chamber or affect the chip collecting function of the blade while maintaining the exhaust noise muffling effect.

The cover passage is easily formed by a guide plate having an opening at the end opposite to the sawing direction that encloses the blade chamber in front of the exit side of the ports.

As there may be many other modification, alterations, and changes without departing from the scope or spirit of essential characteristics of the present invention, it is to be understood that the above embodiment is only illustrative and not restrictive in any sense. The scope or spirit of the present invention are limited only by the terms of the appended claims.

What is claimed is:

1. A rotary saw, comprising
a cooling fan coupled to an output shaft of a motor,
fluid communication means forming an air intake to permit cooling air to flow from said cooling fan to a blade chamber formed by a blade case such that said cooling air delivered by the cooling fan is blown into the blade chamber through the fluid communication means, and
means forming a guide passage in the blade chamber for separating the cooling air passing through said fluid communication means from a pathway of airflow created by a rotating saw blade mounted within the blade chamber, said guide passage having means forming an opening for discharging the cooling air out of the blade chamber.

2. A rotary saw according to claim 1, wherein said guide passage is formed by a cover plate interposed between said fluid communication means and said pathway of airflow generated by the rotating saw blade, whereby said cover plate isolates said cooling air from said pathway of airflow created by the rotating saw blade.

3. A rotary saw according to claim 2, wherein the fluid communication means comprises a plurality of ports.

4. A rotary saw according to claim 3, wherein said ports are arranged radially with the output shaft as the center.

5. A rotary saw according to claim 2, wherein said output shaft has an axis and the cover plate is a semi-circular plate having a first section mounted in a first plane substantially orthogonal to the axis and having a second section coplanar with a second plane transverse to said first plane.

6. A rotary saw according to claim 1, further comprising a boss projecting from the blade case for supporting the cover plate.

7. A rotary saw according to claim 1, wherein the guide passage is formed by a partition interposed between said fluid communication means and said airflow generated by the rotating saw blade, said partition being integrally formed with the blade case, whereby said partition isolates said cooling air from said pathway of airflow created by the rotating saw blade.

8. A rotary saw according to claim 1, further comprising means forming an outlet at the end of the pathway of airflow created by the rotating saw blade.

9. A rotary saw according to claim 1, further comprising means forming an outlet in the blade case for discharging out of the rotary saw the cooling air introduced into the blade chamber through the opening in the guide passage.

10. A rotary saw according to claim 8, further comprising a dividing wall formed below the pathway of airflow created by the rotating saw blade and near the outlet for separating the outlet and the opening in the guide passage from the pathway of airflow.

11. A rotary saw according to claim 9, further comprising a dividing wall formed below the pathway of airflow created by the rotating saw blade and near the outlet for separating the outlet and the opening in the guide passage from the pathway of airflow created by the rotating saw blade.

* * * * *